United States Patent [19]

Cole

[11] 4,142,309
[45] Mar. 6, 1979

[54] SCRAPER BOWL-LIFT APPARATUS

[75] Inventor: Carroll R. Cole, Decatur, Ill.

[73] Assignee: Caterpillar Tractor Co., Peoria, Ill.

[21] Appl. No.: 878,859

[22] Filed: Feb. 17, 1978

[51] Int. Cl.$^2$ .............................................. E02F 5/00
[52] U.S. Cl. .................................................. 37/126 R
[58] Field of Search ................ 37/124, 126 R, 126 A, 37/126 AA, 129, 8

[56] References Cited

U.S. PATENT DOCUMENTS

| | | | |
|---|---|---|---|
| 3,295,234 | 1/1967 | Hawk | 37/129 |
| 3,406,470 | 10/1968 | Fall et al. | 37/129 |
| 3,499,236 | 3/1970 | Hawk | 37/129 |
| 3,553,860 | 1/1971 | Fisher et al. | 37/129 |
| 3,657,830 | 4/1972 | Hamilton | 37/129 |
| 3,903,623 | 9/1975 | Hyler | 37/8 |

FOREIGN PATENT DOCUMENTS 687870  6/1964  Canada ........................ 37/129

*Primary Examiner*—E. H. Eickholt
*Attorney, Agent, or Firm*—John L. James

[57] ABSTRACT

The relative movement between the draft frame and the bowl member of a scraper bowl-lift apparatus is controlled by one or more bowl-lift motors. The longitudinal centerline of the motor passes through a spreader member of the draft frame. One end of the motor is pivotally connected to a shrouded motor support at a location above the spreader member while the other end of the motor is pivotally connected to a preselected portion of the bowl member. By so orienting the bowl-lift motor relative to the spreader, the entire draft frame apparatus is of improved strength and efficiency.

15 Claims, 4 Drawing Figures

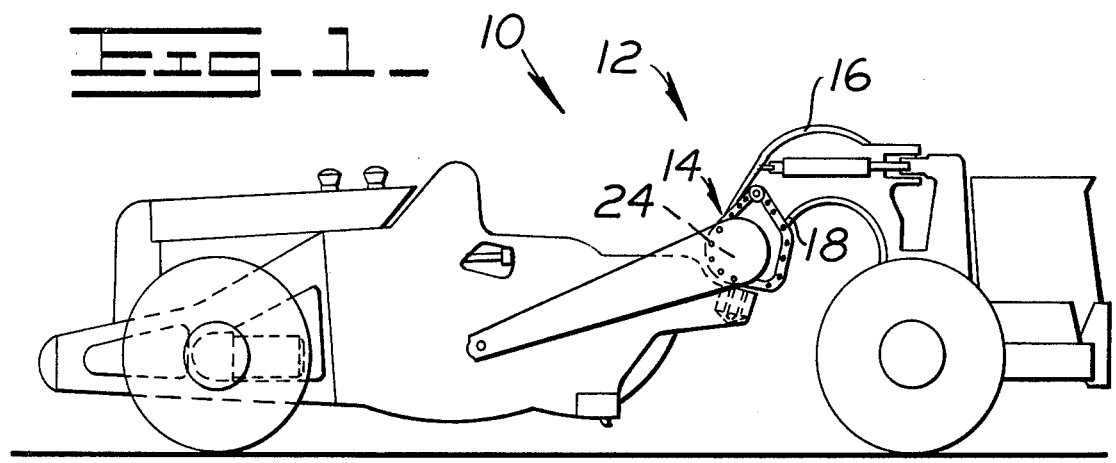
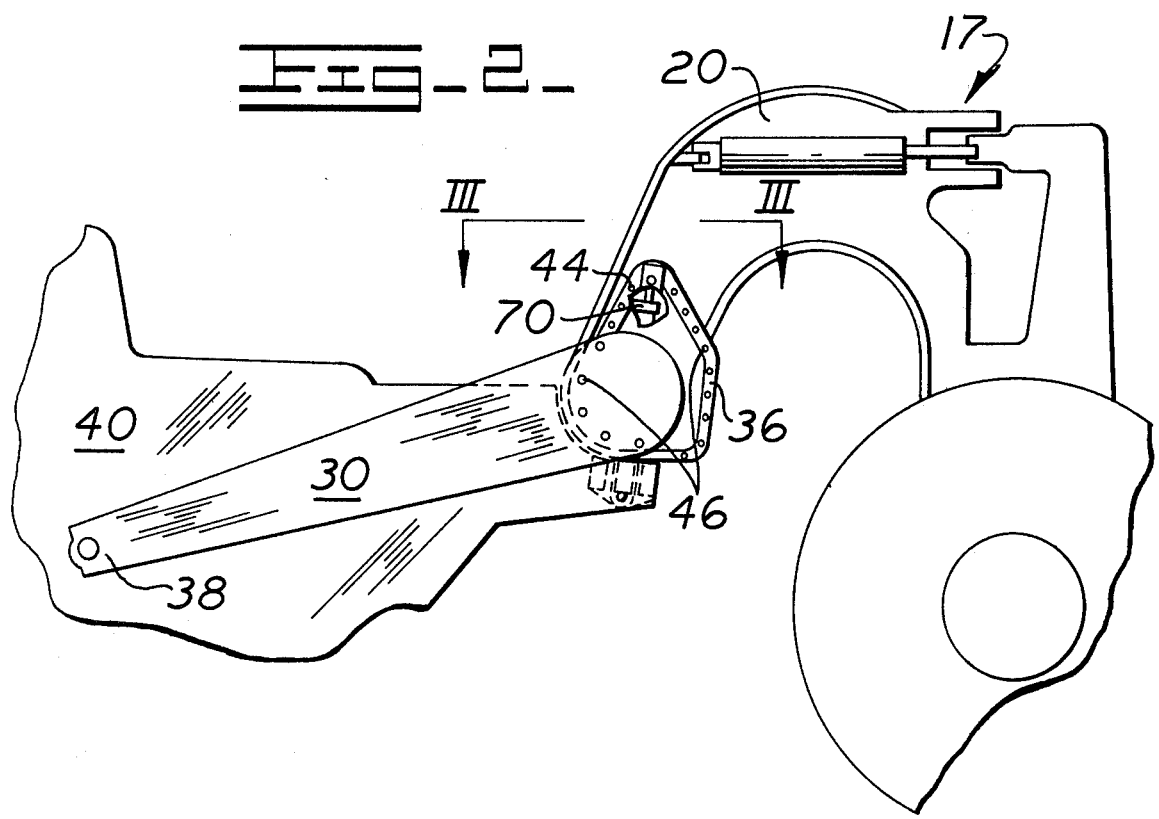

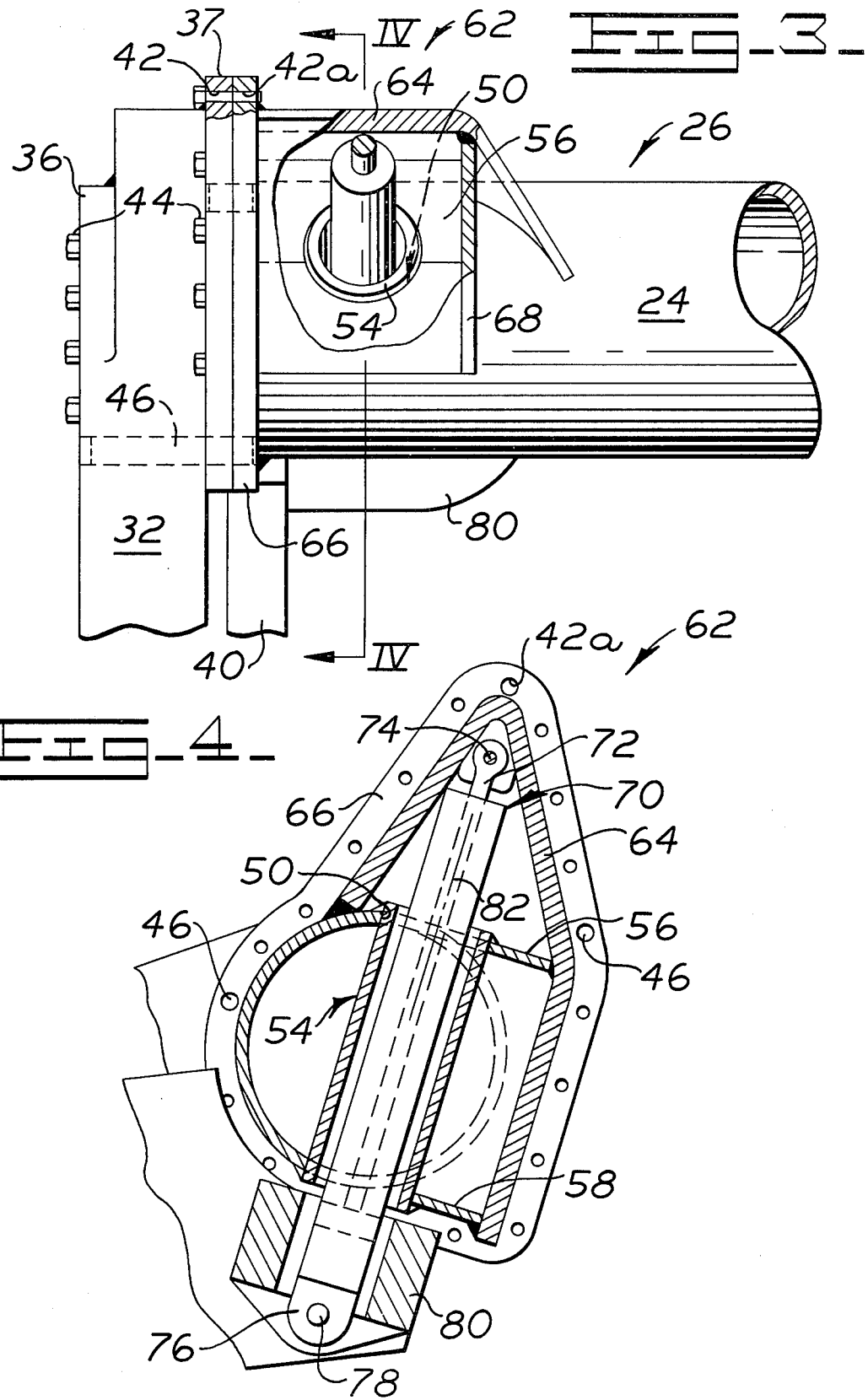

SCRAPER BOWL-LIFT APPARATUS

BACKGROUND OF THE INVENTION

The bowl-lift mechanisms and related structures of heretofore utilized scrapers were located at such a considerable height above the vehicle that they did not have operational clearance in many low overhead work areas such as found in mines and some construction work sites. The scraper was also undesirably long from the steering pivot to the back axle, owing to space allowed for bowl-lift mechanism between the draft arm and the bowl assembly. This added length contributed to an unnecessarily wide turning radius.

In consideration of the draft frame strength, it was required to employ extra heavy reinforcement members and, in some cases, frame members were cut away in order to provide for operational clearance of these heretofore utilized bowl-lift mechanisms. The weakened areas, in turn, required additional strengthening plates and gussets which undesirably increased the overall weight of the vehicle.

The bowl-lift motors were oriented between the draft frame and the front of the bowl which resulted in exerting unusual torque forces into the draft frame spreader when the bowl was loaded. In addition, the motors were generally centrally located on the draft frame spreader member which resulted in requiring the bowl support member to carry the entire bowl load from the sides of the bowl towards this central location. These arrangements required an undesirably heavy construction across the bowl support member and the draft frame spreader member. The motor stems were also undesirably exposed to wear and damage from wheel debris.

The present invention is directed to overcoming one or more of the problems set forth above.

Summary of the Invention

According to the present invention, a scraper bowl-lift apparatus has draft frame and bowl member control with the longitudinal centerline of the motor passing through a spreader member at a preselected location in the draft frame which provides a lower profile vehicle with improved maneuverability and capacity.

BRIEF DESCRIPTION OF THE DRAWINGS

FIG. 1 is a diagrammatic side view of a bowl-lift apparatus in a scraper;

FIG. 2 is an enlarged side view of the bowl-lift arrangement with portions broken away;

FIG. 3 is a diagrammatic top view of a portion of the bowl-lift arrangement with portions broken away;

FIG. 4 is a diagrammatic view of the bowl-lift arrangement in cross section, taken along IV—IV of FIG. 3 with portions broken away.

Detailed Description of the Invention

Referring to FIG. 1, a low profile scraper 10 has a bowl-lift apparatus 12, a bowl member 40 and an associated draft frame 14, including a gooseneck 16, a spreader member 24, and a pair of draft arms 30, 32. The gooseneck 16 has a first end portion 18 that is fixedly connected to a middle, upper portion of the spreader member 24, and a second end portion 20 which extends upwardly to a scraper hitch 17, the highest point on the scraper 10.

Referring to FIGS. 2 and 3, the spreader member 24 extends generally across the scraper 10 normal to the gooseneck 16 and has end portions 26. The draft arms 30, 32 each have first and second end portions 36, 38, respectively. The draft arms 30, 32 are releasably connected at their first end portions 36 to the respective spreader end portion 26 and pivotally connected at their second end portions 38 to a respective middle portion of the bowl member 40.

Referring to FIGS. 3 and 4, each draft arm first end portion 36 has a large flange 37 which has a plurality of peripherally located interspaced holes 42 which receive at least two dowels 46 and a plurality of fasteners 44.

Each of spreader end portions 26 has an opening 50 and a reinforcement conduit 54 rigidly connected in a generally vertical position within the opening 50. The conduit 54 is reinforced by plates 56 and 58. The flange plate 66 has a plurality of peripherally located and interspaced holes 42a which receive the dowels 46 and the plurality of fasteners 44 when the draft arm flange 37 is secured to the motor support flange 66.

The motor support 62 is fixedly connected to an upper portion of the respective spreader end portion 26 above said opening 50 and conduit 54, but below the highest point of the gooseneck 16. Each motor support 62 comprises a brace 64 which covers the conduit 54 on at least one side, a flange plate 66 which covers an outer side of the brace 64, and an inner plate 68 which covers an inner side of brace 64, each being rigidly connected to one another and to the spreader end portion 26 and the conduit reinforcement plates 56, 58, as shown.

A pair of hydraulic motors 70 each has a first end 72, pivotally connected by a first pin 74 to an upper portion of the motor support brace 64, and a second end 76 pivotally connected by a second pin 78 to a preselected portion of a bowl support 80. The longitudinal centerline 82 of the motor 70, passes through the spreader member 26 within the conduit 54.

In the operation of the scraper bowl-lift apparatus 12, the motors 70 are variably extendable and retractable when controlled by an operator. When the motor 70 is extended, the front portion of the bowl member 40 is permitted to separate downwardly from the draft frame 14 until it engages the ground for the fill and spread cycle. While in this extended position, the stem portion 72 of the hydraulic motor 70 is protected from environment debris by the support brace 64, the flange plate 66 and the inner plate 68.

When the operator wishes to discontinue the fill and spread cycle and change the bowl to the carry position, he actuates the motor 70 to a retracted position. The upper end of the motor pulls from the elevated connection in the motor support 62 while the lower end of the motor lifts the forward end portion of the loaded bowl member 40 in a lifting motion on a line passing through the spreader member 24 until the bowl abuts the draft frame 14.

While in any of the above described positions, an operator may carry heavier pay loads into work areas with lower overhead obstructions and maneuver the scraper around obstacles requiring a smaller turning radius.

The embodiments of the invention in which an exclusive property or privilege is claimed are defined as follows:

1. In a scraper bowl-lift apparatus having a draft frame, a gooseneck, a spreader member, a pair of draft arms, and a bowl member, the improvement comprising:

at least one motor having a longitudinal centerline and first and second end portions and passing through the spreader member, said first end portion being pivotally maintained relative to the spreader member, said second end portion being pivotally maintained relative to a preselected portion of the bowl member for passing the longitudinal centerline of said motor through said spreader member.

2. The bowl-lift apparatus, as set forth in claim 1, including a conduit extending through the spreader member and being positioned between the motor and the spreader member.

3. The bowl-lift apparatus, as set forth in claim 2, where in portions of said conduit are connected to the spreader member.

4. In a scraper bowl-lift apparatus having a draft frame, a gooseneck, a spreader member, a pair of draft arms, and a bowl member, the improvement comprising:

at least one motor having a longitudinal centerline and first and second end portions and passing through the spreader member, said first end portion being pivotally maintained relative to the spreader member, said second end portion being pivotally maintained relative to a preselected portion of the bowl member for passing the longitudinal centerline of said motor through said spreader member; and a motor support connected to the spreader member and the draft arm and being pivotally connected at an upper portion to the first end portion of the motor.

5. The bowl-lift apparatus, as set forth in claim 4, wherein the motor support extends to a position higher in elevation than the motor and the spreader member and lower in elevation than the gooseneck.

6. The bowl-lift apparatus, as set forth in claim 4, including fastening means and flange means for connecting the motor support to the draft arm.

7. The bowl-lift apparatus, as set forth in claim 6, wherein the flange means is a plurality of dowels extending from one of the draft arm and motor support into the other of said draft arm and motor support.

8. The bowl-lift apparatus, as set forth in claim 7, wherein the fastening means is a plurality of bolts.

9. The bowl-lift apparatus, as set forth in claim 6, wherein the fastening means is a plurality of bolts.

10. The bowl-lift apparatus, as set forth in claim 4, wherein the pivotal connection of the first end portion of the motor to the motor support is a pin extending from the motor support along the spreader member and being spaced therefrom.

11. The bowl-lift apparatus, as set forth in claim 10, including a brace member connected at one end to the spreader member and at the other end to the pin.

12. The bowl-lift apparatus, as set forth in claim 11, wherein the brace member covers the first end portion of the motor.

13. The bowl-lift apparatus, as set forth in claim 12, wherein said brace member is connected to said motor support.

14. The bowl-lift apparatus, as set forth in claim 12, wherein portions of said conduit are connected to the brace member.

15. The bowl-lift apparatus, as set forth in claim 14, wherein portions of said conduit are connected to the spreader member.

* * * * *